July 13, 1937.  H. J. SMITH  2,087,072
CONTROL APPARATUS
Filed Aug. 25, 1932   5 Sheets-Sheet 1

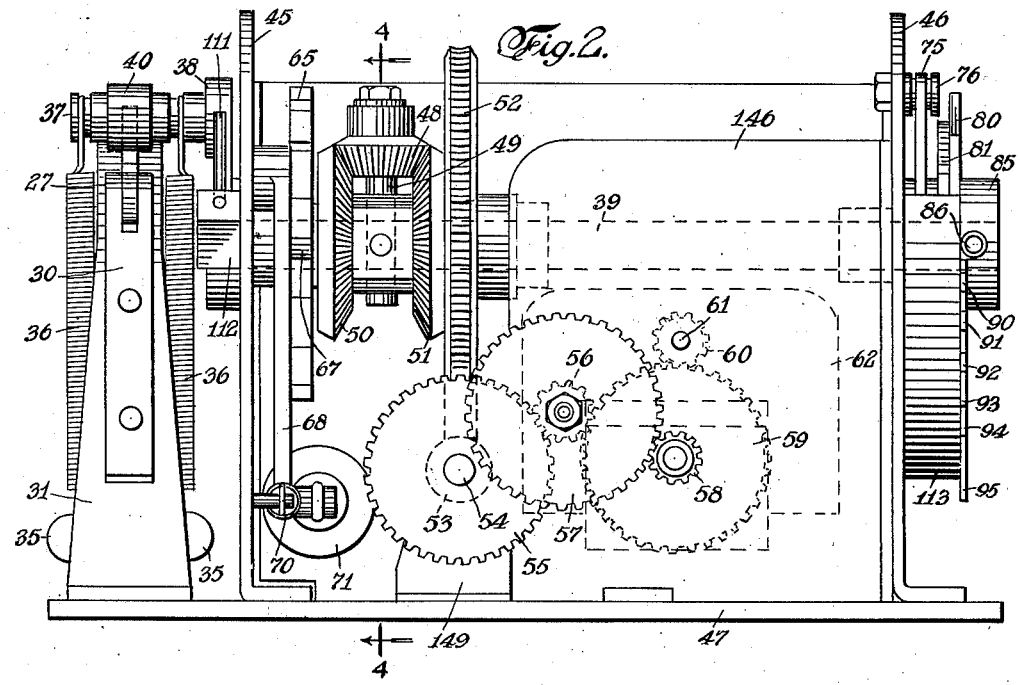
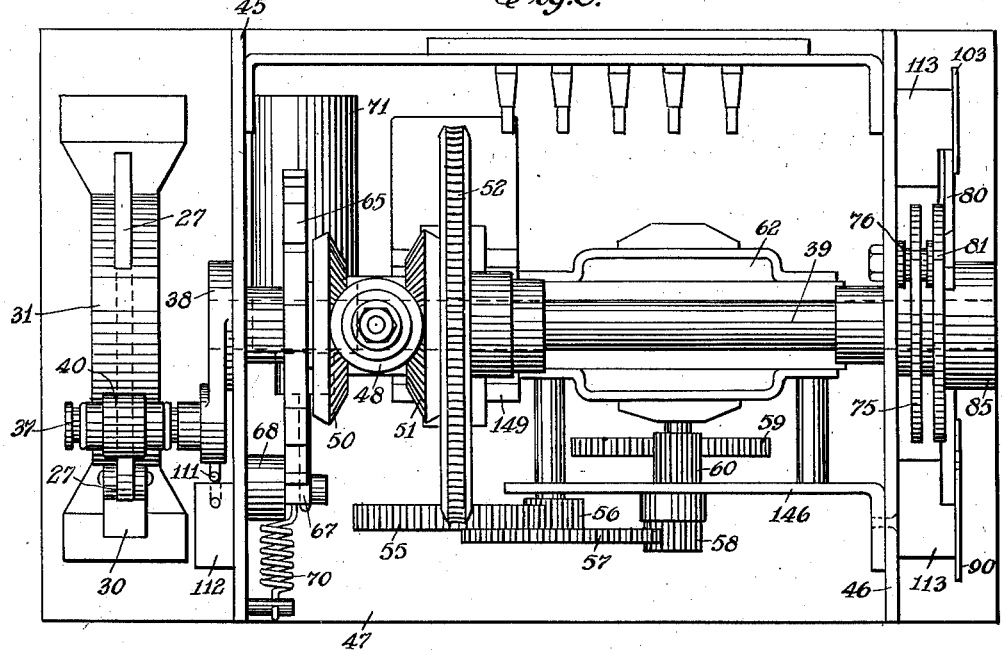

July 13, 1937.  H. J. SMITH  2,087,072
CONTROL APPARATUS
Filed Aug. 25, 1932   5 Sheets-Sheet 3

COLD ←→ HOT

INVENTOR
Harry J. Smith
BY
Wm. J. Cuteband
ATTORNEY

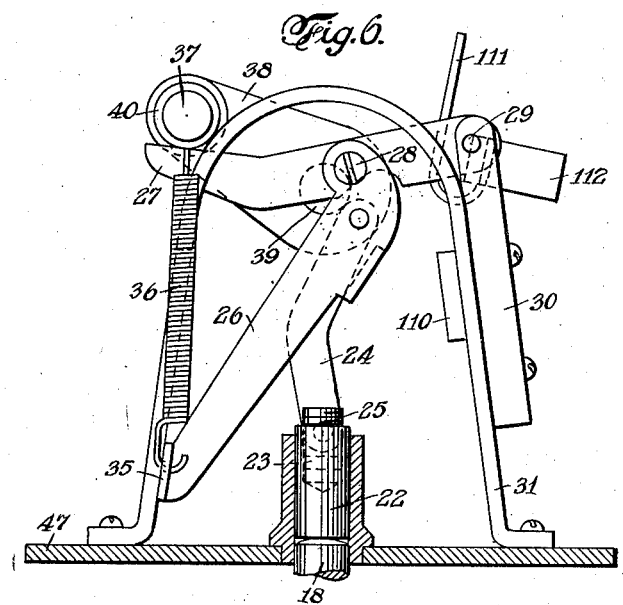
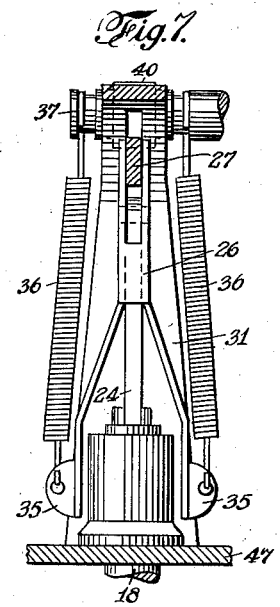
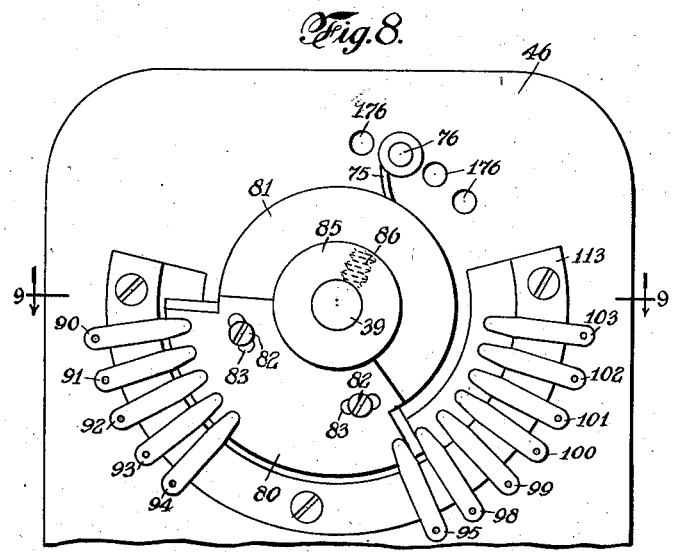
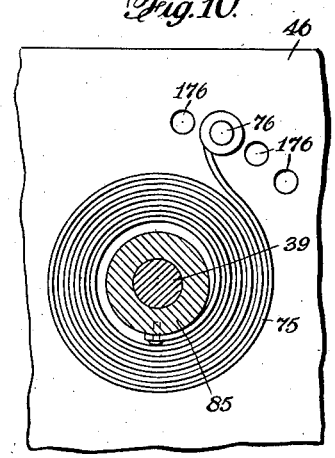
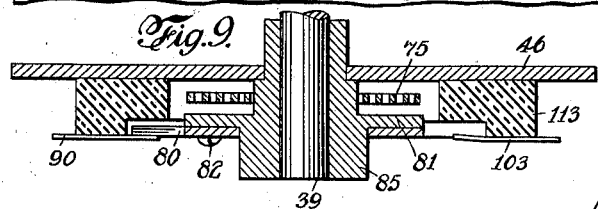

July 13, 1937.  H. J. SMITH  2,087,072
CONTROL APPARATUS
Filed Aug. 25, 1932  5 Sheets-Sheet 5
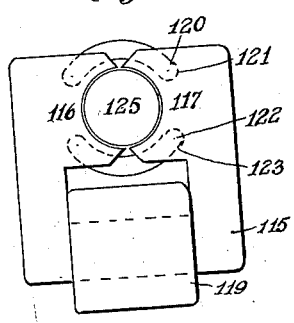
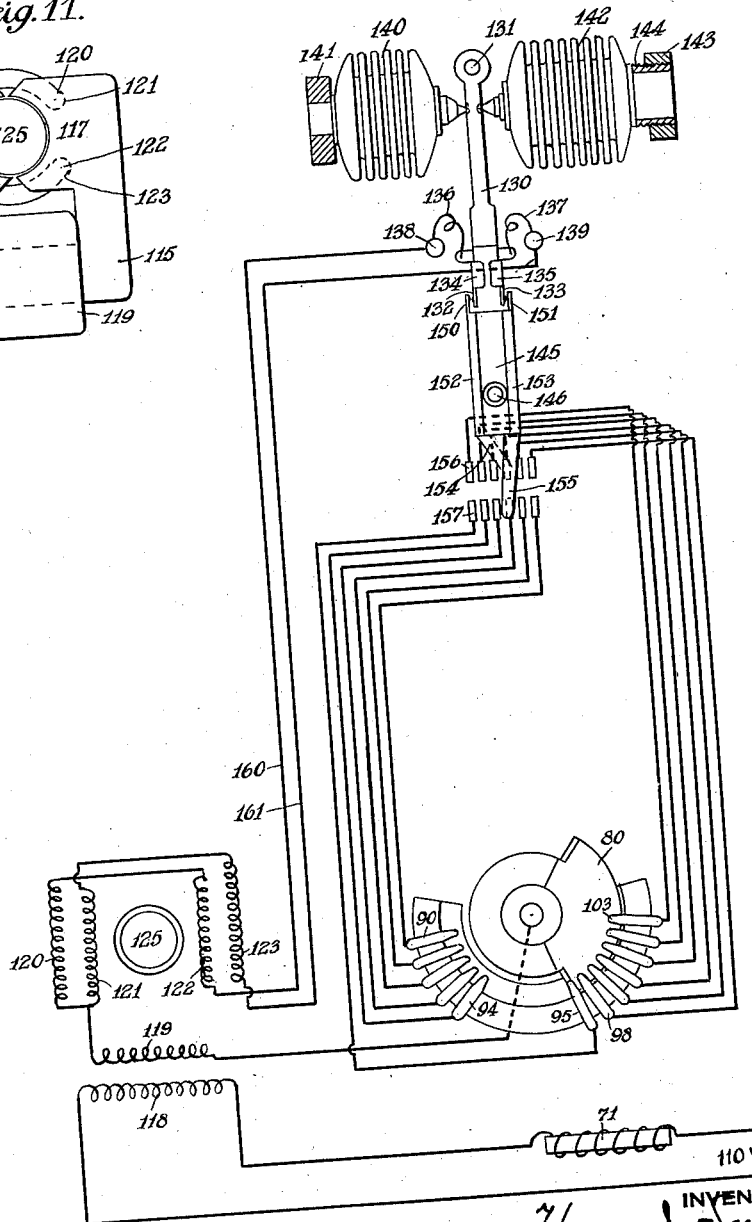

Patented July 13, 1937

2,087,072

UNITED STATES PATENT OFFICE 2,087,072

CONTROL APPARATUS

Hazor J. Smith, Springfield, Mass., assignor, by mesne assignments, to General Motors Corporation, Detroit, Mich., a corporation of Delaware Application August 25, 1932, Serial No. 630,417

22 Claims. (Cl. 236—48)

This invention relates to a condition-control apparatus, and more particularly to an apparatus for controlling a fluid supply in response to variations in condition.

The invention is particularly useful for controlling the fuel supply to a gas burner of the type which requires a given minimum amount of fuel for proper operation. For example certain types of air-mixing burners require a given minimum valve opening to provide an immediate supply of gas in sufficient volume to prevent a flareback in the burner when it is ignited by the pilot. For satisfactory operation, the burner also requires a given minimum fuel supply to prevent gusts of wind or other abnormal conditions from causing a flareback into the burner.

The invention is also applicable to the control of various valves where a rapid operation is desirable within given ranges, for example, to avoid pitting of the valve seat when the valve is opened or closed.

An object of the invention is to provide a control device which quickly opens a fluid-supply valve to a given minimum point and thereafter produces a modulated change in the valve opening.

Another object is to provide a control which quickly closes the supply valve when a given minimum opening is reached.

Another object is to provide a control which quickly closes the supply valve from any point in response to failure of the current supply to the control device.

A further object is to provide a simple, safe and dependable control of the type above specified.

The invention also consists in certain new and original types of construction and combinations of parts hereinafter set forth and claimed.

Although the novel features which are believed to be characteristic of this invention will be particularly pointed out in the claims appended hereto, the invention itself as to its objects and advantages and the manner in which it may be carried out may be better understood by referring to the following description taken in connection with the accompanying drawings forming a part thereof, in the various figures of which like reference characters have been used to denote like parts.

One embodiment of the invention is shown in the drawings in which:

Figure 2 is a side elevation of the control unit showing the motor and operating mechanism.

Figure 3 is a plan view of the control unit.

Figure 6 is a side elevation of the valve-operating mechanism in open position.

Figure 7 is a section taken on the line 7—7 of Figure 6.

Figure 8 is an elevation of the motor-control commutator and brushes in the full open position.

Figure 9 is a section taken on the line 9—9 of Figure 8.

Figure 10 is a detail view showing the safety closing spring.

Figure 11 is a side elevation of a preferred type of motor, and

Figure 12 is a diagrammatic view showing the control apparatus and the electrical connections thereto.

Figure 1:
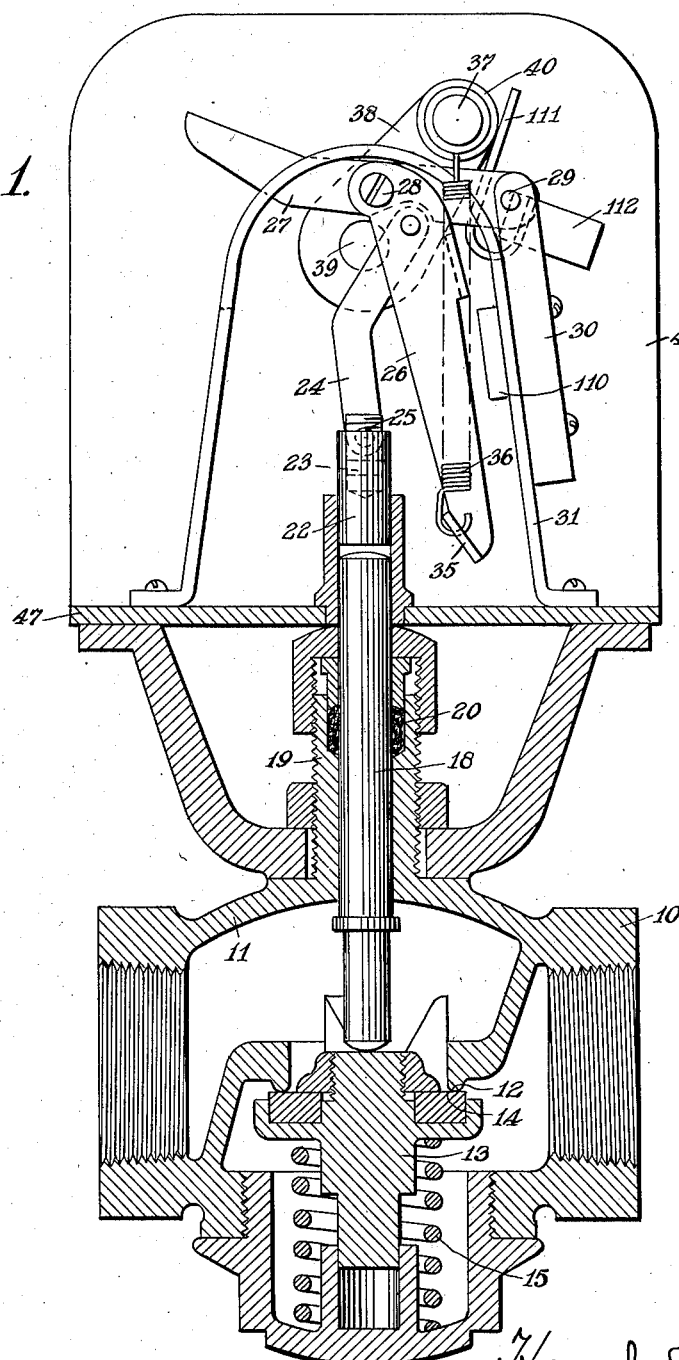
Figure 1 is an end elevation, partly in section, of a control unit embodying the present invention and showing a fluid-supply valve associated therewith.

In the following description and in the claims various details will be identified by specific names for convenience, but they are intended to be as generic in the application as the art will permit.

In the embodiment of the present invention shown in the drawings, the control is applied to a fluid-supply valve, such as a gas-supply valve, which is adapted to control the fuel supply to a heat source. The valve is controlled by a motor-control unit actuated in response to a condition-responsive means, such as a thermostat, pressure-actuated switch or the like. Obviously, the invention may be applied to various uses, such as to the control of the fuel supply of a furnace in response to temperature variations in a room or in the furnace itself; the control of a steam valve to avoid pitting due to steam flow when the opening is small; or the like. One embodiment of the invention has been shown merely for purposes of illustration and not as a limitation of the scope of the invention.

Referring to the drawings, Figure 1 shows a valve 10 which may constitute, for example, the fuel supply valve to a gas burner or a steam valve. This valve comprises a casing 11 having a seat 12 formed thereon. A valve stem 13, carrying a valve seat 14, is mounted in the casing 11 by any suitable means, the seat 14 being held by a spring 15 in engagement with the seat 12, whereby the valve tends to remain in closed position.

A plunger 18 (Figures 1, 6 and 7) engages the valve stem 13 and is slidably journaled in a portion 19 of the casing 11, packing 20 being provided, in a manner well known in the art, to form a gas-tight seal about said plunger. The plunger 18 carries at its upper end a threaded member 22, which is in threaded engagement with a link support 23. A link 24 is pivoted at one end to the link support 23 as by a pin 25 and is pivoted at its other end to a forked lever 26, which is pivotally carried on an arm 27 as by a pivot 28. The arm 27 is connected by a pivot 29 to a bracket 30, which is carried by support 31, said support being secured to the valve housing 11 in any suitable manner.

Link 24 and lever 26 are arranged to provide a toggle joint, the toggle being substantially straight between the plunger 18 and the pivot 28 when the lever 26 is moved to the valve opening position shown in Figure 6. To limit the movement of lever 26, stop means is provided, such as ears 35, formed on the lever 26 and adapted to engage support 31, when the lever has assumed its valve opening position above specified.

Springs 36 are secured between the ears 35 of the lever 26 and a pin 37 carried on an arm 38, which is rigidly secured to a main operating shaft 39. Arm 38 also carries a roller 40 in a position to contact with and depress arm 27 in response to movement of arm 38 in the valve opening direction.

The operating position of the arm 38 is such that, when said arm is rocked clockwise to the position in Figure 1, springs 36 cause the lever 26 to assume the valve closing position in which the toggle is broken and plunger 18 is raised from valve stem 13, thereby permitting the spring 15 to close the valve. When the arm 38 moves in a counterclockwise direction, no movement of the lever 26 will take place until arm 38 passes center with respect to springs 36 and lever 26, thereby causing springs 36 to snap the arm 26 over to the valve opening position, straightening the toggle, depressing the plunger 18 and opening the valve 10 a predetermined amount. Thereafter, continued counter-clockwise movement of the arm 38 causes roller 40 to engage the arm 27 and to depress said arm about the pivot 29. Since the toggle joint is now substantially straight and rigid, depression of the arm 27 causes the link 24 and the plunger 18 to move downwardly as a unit and to cause corresponding movement of the valve stem 13, thereby opening the valve 10 until full open position is reached as shown in Figure 6.

Conversely, when the arm 38 is progressively moved in a clockwise direction, the arm 27 is gradually elevated as the pressure exerted by roller 40 is decreased, thereby permitting the valve 10 to gradually close until the minimum opening is reached. Further movement of arm 38 until it passes center with respect to the toggle joint then causes the lever 26 to snap quickly to its valve closing position and to thereby permit the valve to completely close.

A stop member 110, preferably of yieldable material, such as leather or rubber, may be carried by support 31 to engage lever 26 and limit its movement in the valve closing direction. A spring stop 111 may be mounted on a block 112 carried by support 31 to engage arm 38 and limit the movement thereof in the valve closing direction.

Figure 4:
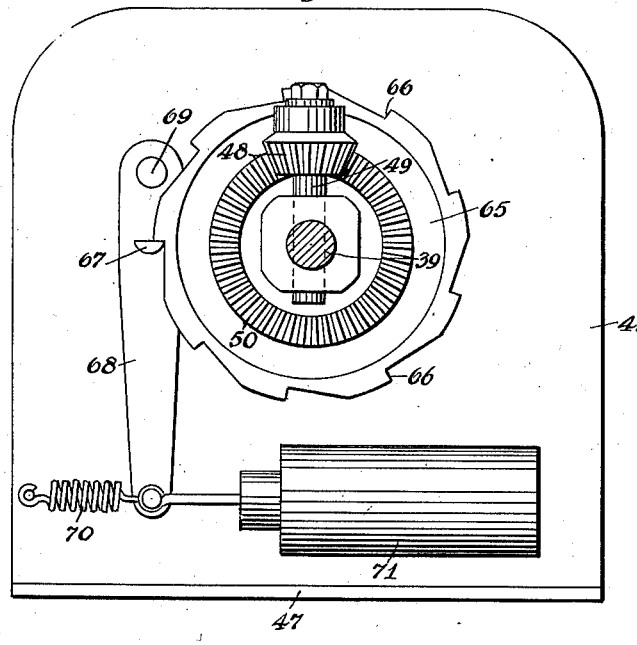
Figure 4 is a section taken on the line 4—4 of Figure 2 showing the safety trip mechanism.

Referring now to the motor-control unit illustrated in Figures 2 and 3, the main operating shaft 39 is journaled in bearings (not shown) in supports 45 and 46 carried on a base plate 47. A beveled pinion 48 is loosely carried on a pin 49 (Figure 4), which is secured in the shaft 39 and extends transversely thereof. Said pin 49 serves to control the position of the shaft 39 and thereby the position of the arm 38 and the cooperating mechanism above described.

A pair of beveled gears 50 and 51 are loosely journaled on the shaft 39 in engagement with the beveled pinion 48. Secured to the beveled gear 51 is a worm gear 52 engaging a worm 53 carried on a shaft 54. Said shaft 54 also carries a gear 55 in engagement with a pinion 56 having a gear 57 secured thereto in engagement with another pinion 58. The pinion 58 carries a gear 59 which engages a driving gear 60 mounted on a shaft 61 of motor 62. Gears 57 and 59 and pinions 56 and 58 are mounted on idler shafts journaled in support 146 which is carried by support 45. Shaft 54 is journaled in a support 149 mounted on base plate 47. The worm gear 52 and the worm 53 preferably constitute a non-reversible drive for beveled gear 51 so as to effectively lock the mechanism against movement when the motor 62 is de-energized.

Secured to the beveled gear 50 is a ratchet 65 (Figure 4) having a plurality of teeth 66 selectively engaging a pawl 67 carried on a lever 68 which is secured by a pivot 69 to the support 45. Coil spring 70 tends to hold lever 68 in retracted position. Opposing the pull of spring 70 is a solenoid 71 which, when energized, serves to move the pawl 67 into engagement with said ratchet 65.

Figure 5:
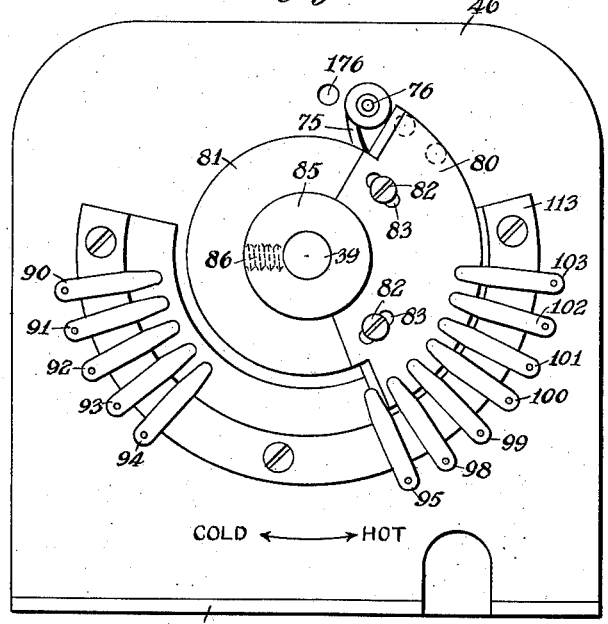
Figure 5 is an end elevation of the control unit showing the motor-control commutator and brushes.

The commutator mechanism (Figures 5, 8 and 9) comprises a commutator segment 80 adjustably secured to a flange 81 of bushing 85 as by screws 82 passing through elongated slots 83 in said commutator segment. The bushing 85 may be secured to the shaft 39 by a set screw 86.

A coil spring 75 (Figure 10) is secured to bushing 85 and is anchored to a stop comprising a pin 76 which may be inserted in one of a set of apertures 176 in the support 46. Said spring 75 is adapted to cause movement of the shaft 39 in a direction to bring the arm 38 into valve closing position so as to close the valve 10.

Cooperating with the commutator segment 80 are brushes 90 to 95 which may be called the hot brushes, and brushes 98 to 103 which may be called the cold brushes. These brushes are mounted on an insulating segment 113 carried by support 46 and are respectively connected to a suitable condition-responsive device to be described.

Although any type of reversible electric motor may be used in connection with the motor-control unit, a preferred form is disclosed in the drawings, particularly in Figure 11, as a shaded pole motor which is adapted to be directly connected to a 110 volt line, but which is operated by contacts at a substantially lower voltage as, for example, 30 volts. This type of motor is particularly advantageous inasmuch as relays are eliminated and the control contacts are not required to operate at line voltage.

Referring to Figure 11, the motor comprises a field member 115 having a pair of pole pieces 116 and 117. A double field coil is mounted on the field member 115. This coil comprises a primary 118 which is adapted to be directly connected to the 110 volt line and to furnish the magnetizing force for the field. A secondary 119 is associated with the primary 118, in induced relationship therewith, and is adapted to have a voltage induced therein substantially lower than that in the primary 118, for example, 30 volts. Pairs of shading coils are associated with the pole pieces 116 and 117. These may comprise a first pair of coils 120 and 121 and a second pair of coils 122 and 123, the pairs being mounted in suitable slots in the pole pieces in a position to control the flux distribution across the face of the pole pieces. The coils of each pair are oppositely wound and when selectively energized are adapted to cause opposite rotation of the armature 125.

Although the above-described motor is particularly advantageous in the present system, it is to be understood that the invention is not limited thereto but that various well-known types of motors may be employed.

Referring to Figure 12 in which the electrical connections to the various parts of the apparatus are diagrammatically illustrated, the condition-responsive unit comprises a pivoted arm 130 pivoted, for example, at the pivot 131 and provided at its free end with a pair of contact members 132 and 133 respectively which are electrically connected through conducting strips 134 and 135 and flexbile connectors 136 and 137 to binding posts 138 and 139 respectively. A sylphon bellows 140 which may, for example be actuated in response to variations in pressure or temperature of the medium which is to be controlled by the device, is mounted on a fixed support 141 and engages the lever 130 in a position to cause pivotal movement thereof about the pivot 131. A resilient means, such as a second sylphon bellows 142, may engage the opposite side of the lever 130 and may have a compressible fluid, as compressed air, incorporated therein. Sylphon bellows 142 may be adjustably mounted on support 143, for example, by threads 144, to permit adjustment with respect to lever 130. The range of operation of the device may be adjusted by varying the pressure of the fluid in sylphon bellows 142 or by adjusting said bellows 142 in support 143.

A contact lever 145 is mounted about pivot 146 and carries at one end a pair of contacts 150 and 151 adapted to respectively engage the contacts 132 and 133 of the lever 130. Contacts 150 and 151 are connected by metallic connectors 152 and 153 to contact brushes 154 and 155 which are adapted to make contact with rows of contacts 156 and 157 respectively. Contacts 156 and 157 constitute step-by-step contacts, whereas contacts 132, 133, 150 and 151 constitute reversing contacts for the motor-control unit.

The primary 118 is connected in series with the solenoid 71 to a 110 volt A. C. line. Secondary 119 is connected in series with the shading coils and with the various contacts of the condition-responsive device in the following manner. One end of the secondary 119 is connected to shading coils 120 and 121, thence in parallel to shading coils 122 and 123 and by conductors 160 and 161, to binding posts 138 and 139 above mentioned. From binding posts 138 and 139 a circuit is completed through contacts 132 and 150, or through contacts 133 and 151, depending upon the position of arm 130, to one of the brushes 154 and 155, thence through the corresponding set of step-by-step contacts to one of the brushes 90 to 95 or 98 to 103, engaging the commutator 80. The commutator 80 is grounded to the opposite side of the secondary 119, thereby completing the circuit through the shading coils.

It is to be noted that the brushes 90 to 95, which constitute the hot contacts, are connected individually to step-by-step contacts 157 and that brushes 98 to 103, which constitute the cold brushes, are connected individually to the step-by-step contacts 156. The arrangement is such that, by means of the circuit above traced, the motor is caused to operate and to thereby cause rotation of the commutator 80 until the commutator breaks contact with whichever of the brushes 90 to 95 or 98 to 103 is energized at that particular instant, thereby breaking the circuit between secondary 119 and the shading coils. The apparatus is adapted to exert sufficient drag on the motor to prevent the motor from operating when the circuit through the shading coils is broken. Obviously, however, an additional braking means may be employed, if desired.

In the operation of the above-described mechanism, arm 130 is moved pivotally in response to variations in the condition-responsive device. Reversals in movement of said arm first cause reversal in position of the reversing contacts 132 and 133. Continued movement of the arm 130 in one direction causes movement of the brushes 154 and 155 over the step-by-step contacts 156 and 157 respectively. Assume the operation to start from the position shown in Figure 1 in which the valve 10 is closed and the temperature or pressure supplied to the condition-responsive device to be gradually reduced. This will cause arm 130 to move so as to close cold contacts 132, 150 of the reversing switch and to complete a circuit through brush 154, one of the step-by-step contacts 156 and one of the corresponding cold brushes 98 to 103. The motor will then operate and rotate the shaft 39 until the commutator 80 breaks contact with the energized brush. It is noted that a substantial angular movement of the commutator is required before the commutator runs out from under the first cold brush 103. This movement is sufficient to move the arm 38 past its vertical center and operate the toggle joint to suddenly open the control valve by the predetermined minimum amount. Thereafter, upon continued movement of the arm 130, a circuit is progressively completed through the step-by-step contacts 156 and through the various brushes 102 to 98 of the commutator control in the order named. As the circuit is completed to each of the above brushes 102 to 98, the motor 62 operates to run the commutator 80 out from under the corresponding brush. Each successive movement of the shaft 39 causes a corresponding movement of the arm 38, which depresses the arm 27 and progressively opens the valve 10 to its fullest extent.

If now the arm 130 of the condition-responsive device moves in the opposite direction as, for example, in response to a rise in temperature, the reversing contacts 133, 151 are actuated to complete a circuit through the brush 155, step-by-step contacts 157 and brushes 90 to 95. This causes reverse operation of the motor until the commutator 80 runs out from under the energized brush. Further movement of the arm 130 in the same direction progressively completes the circuit to brushes 90 to 95, causing corresponding successive movements of the commutator 80, the shaft 39 and arm 38. It will be noted that a substantial gap exists between the brushes 94 and 95. This gap is adapted to permit movement of the arm 38 past its vertical center so as to operate the toggle mechanism and completely close the valve. The brushes and commutator are normally set to stop arm 38 before it reaches the limit of its movement. Spring stop 111, however, serves to interrupt the movement of arm 38 if the normal travel thereof is exceeded.

Assuming the valve mechanism to be in open position and the current to be suddenly shut off, the solenoid 71 becomes de-energized and the spring 70 causes the pawl 67 to disengage from the ratchet 65. This releases the beveled gear 50 and permits the shaft 39 to be rotated by the spring 75 in a direction to close the valve mechanism. During the operation, the beveled gear 51 acts as a stationary rack due to the non-reversible worm drive above described and the pinion 48 rotates on said rack. The arm 38 is rotated by the spring 75 until the spring stop 111 is engaged and the movement of said arm is interrupted thereby. When the current is again applied, the lever 68 is operated to draw the pawl 67 against the ratchet 65. However, the teeth 66 of said ratchet may not be exactly aligned with said pawl. The motor accordingly first drives the beveled gear 50 until one of the teeth 66 of the ratchet 65 engages the pawl 67, the pinion 48 remaining stationary due to the friction of the control mechanism associated with the shaft 39. As soon as the ratchet 65 becomes locked, the beveled gear 50 acts as a stationary rack and further operation of the motor 62 causes the pinion 48 to ride around said rack and to open the valve to the position determined by the particular brush which is energized at the time.

Referring again to Figures 5 and 8, it will be noted that the commutator 89 is of such dimension that, when the segment has broken contact with all of the cold brushes, it is in contact with all of the hot brushes 90 to 95 and extends beyond the hot brush 90 a distance equal to one-half the average distance between cold brushes 98 to 103. The commutator thus alternately breaks contact with a brush of one set and makes contact with a brush of the other set. Hence, the angular positions of the arm 38 during the opening operations bear a half step relationship to the angular position of arm 38 during the valve closing operations. To illustrate—consider the successive angular positions, assumed by the arm 38 as the valve is progressively opened, as numbered 1 to 6 respectively, then the angular positions assumed by the arm 38 as the valve is progressively closed due to the operation of the cold brushes will be intermediate the steps 1 to 6, being, for example, 5½, 4½, etc. This provides eleven operative positions for the valve instead of six positions which would be obtained if the steps provided for opening and closing were identical.

It is to be noted that the sylphon bellows 140 may operate in response to temperature or pressure changes. The opposing force exerted on the arm 130 by the sylphon bellows 142 determines the operating range of the device. If the device is used as a thermostat, for example, any reversal in temperature causes the reversal in movement of the arm 130, thereby changing the position of the reversing contacts 132 and 133 and causing the motor to operate in the reverse direction to a position dependent upon the particular step-by-step contact which happens to be energized.

It is to be further noted that the arrangement is such that the valve opening cannot be less than the predetermined minimum. This prevents the valve from gradually opening or closing and thereby causing an irregular operation of the gas flame or permitting the valve seat to pit, due to extreme gas velocities which might be obtained with very small valve openings. This latter feature is of particular importance in connection with steam valves, inasmuch as "wire drawing" is eliminated thereby. It is obvious, however, that the invention is useful in various cases wherein it is desired to control a valve in response to a variable element and prevent the valve from slowly opening or closing below a predetermined minimum.

I claim:

1. In combination, a condition-control means, a pivoted lever adapted to control the position thereof, a pivoted arm, resilient means interconnecting said lever and said arm, said lever, arm and resilient means being so related as to cause a snap action of said lever when said arm passes center with respect thereto, a second lever carrying said pivoted lever and adapted to vary the position thereof, means whereby continued movement of said arm, after said pivoted lever has been actuated, causes progressive movement of said second lever to thereby cause proportional progressive movement of said condition-control means, condition-responsive means, and means causing movement of said arm proportional to movement of said condition-responsive means.

2. In combination, a condition-responsive means, a condition-control means including a fluid-supply valve, a link adapted to control the position of said valve, a lever cooperating with said link to form a toggle joint, and means operable by said condition-responsive means to first operate said toggle joint to open said valve a predetermined minimum amount and thereafter to cause modulated opening of said valve.

3. In combination, a condition-responsive means, a condition-control means including a fluid-supply valve, a link adapted to control the position of said valve, a lever cooperating with said link to form a toggle joint, a movable support for said lever, and means operable by said condition-responsive means to first operate said toggle joint and to thereafter cause movement of said movable support.

4. In combination, a condition-responsive means, a condition-control means including a fluid-supply valve, a link adapted to control the position of said valve, a snap-action mechanism associated with said link, a movable support therefor, and means operable by said condition-responsive means to first operate said snap-action mechanism for opening said valve a given amount and thereafter operating said movable support for modulating the opening of said valve.

5. In combination, a condition-control means, a link adapted to control the position thereof, a lever pivoted to said link and forming therewith a toggle joint, a pivoted arm carrying said lever, a rotatable arm, resilient means carried by said rotatable arm and adapted to cause snap action of said lever when said rotatable arm passes center with respect thereto, condition-responsive means, and means for causing rotary movement of said rotatable arm proportional to changes in said condition-responsive means.

6. In combination, a condition-control means, a link adapted to control the position thereof, a lever pivoted to said link and forming therewith a toggle joint, a pivoted arm carrying said lever, a rotatable arm, resilient means carried by said rotatable arm and adapted to cause snap action of said lever when said rotatable arm passes center with respect thereto, means carried by said rotatable arm and engaging said pivoted arm in response to further movement of said rotatable arm for moving said link and lever as a unit and thereby causing further movement of said condition-control means, condition-responsive means, and means for causing rotary movement of said rotatable arm proportional to changes in said condition-responsive means.

7. A condition-control system comprising a condition-responsive device, a condition-control device including a fluid-supply valve, link mechanism adapted to operate said valve, means causing snap action of said link mechanism adapted to cause a predetermined minimum opening of said valve, a supporting mechanism for said link mechanism, means operating said supporting mechanism for modulating the opening of said valve, and means controlled by said condition-responsive means for first operating said link mechanism and thereby causing a substantially instantaneous movement of said valve to a predetermined point, said means thereafter operating said supporting mechanism whereby modulated variations of said valve opening are obtained.

8. A condition-control system comprising a condition-responsive device having progressive movement in response to progressive variations in condition, a condition-control device including a rotatable shaft, a motor adapted to operate said shaft, a commutator carried by said shaft, brushes engaging said commutator and electrically connected to said condition-responsive device and adapted to control the operation of said motor, a condition-control valve, and means controlled by said shaft for operating said valve, said means being adapted to cause snap action of said valve between the fully closed position and a given minimum opening and to thereafter cause movement of said valve proportional to the movement of said shaft.

9. A condition-control system comprising a rotatable shaft, a motor operatively associated therewith, a commutator carried by said shaft, a pair of sets of brushes engaging said commutator and adapted to control the operation of said motor, said commutator being in engagement with all of the brushes of one set when contact with the brushes of the other set is broken, condition-responsive means adapted to selectively energize said brushes and to thereby cause said motor to operate, a fluid-supply valve, and means associated with said shaft for operating said fluid-supply valve, said brushes and said commutator being arranged to cause a substantial initial movement of said shaft for opening said valve a predetermined amount and thereafter causing a graduated movement of said shaft.

10. A condition-control system comprising a condition-responsive device, a condition-control element, operating means for said element comprising a rotatable shaft, a motor adapted to operate said shaft, a commutator carried by said shaft, and brushes engaging said commutator and operatively connected to said motor for controlling the operation thereof, said brushes being selectively energized by said condition-responsive means, certain of said brushes being spaced about said commutator so as to cause a substantial movement of said commutator between positions corresponding to closed position of said valve and a predetermined minimum opening thereof, the remainder of said brushes being spaced to cause progressive smaller changes in position of said commutator.

11. In a condition-control system, a condition-responsive means, a condition-control means, a motor adapted to operate said condition-control means, a commutator operatively associated with said motor, and brushes engaging said commutator and peripherally spaced, said brushes being adapted to selectively control the operation of said motor and being selectively energized in response to the progressive movement of said condition-responsive means, certain of said brushes being spaced to cause a substantial movement of said commutator and others of said brushes being spaced to cause smaller progressive movement thereof as said brushes are progressively energized.

12. In combination, a condition-control system comprising a fluid-supply valve adapted to control a condition, a control means for said valve comprising a rotatable shaft, a transverse pin mounted on said shaft and carrying a beveled pinion, a pair of beveled gears on said shaft in engagement with said pinion, motor-control means adapted to operate one of said gears, a commutator carried on said shaft, brushes associated with said commutator and adapted to control the operation of said motor, a ratchet associated with the second of said beveled gears, a pawl normally locking said ratchet, means responsive to interruption of the driving current of said motor for releasing said pawl, spring means associated with said shaft and adapted to rotate said shaft into valve closing position when said pawl is released, said brushes being spaced about said commutator so as to cause an initial substantial movement of said motor and to thereafter cause smaller progressive movements thereof as said brushes are progressively energized, and a condition-responsive means adapted to selectively energize said brushes.

13. In combination, a valve having a valve stem, operating mechanism therefor comprising a link operatively associated with said valve stem, a lever pivotally carrying said link to form a toggle joint, means for causing a snap movement of said toggle joint to thereby rapidly open said valve a substantial amount, and means to thereafter cause progressive movement of said link and lever as a unit for thereby progressively opening said valve to its limit.

14. In combination, a valve, a link adapted to control the opening of said valve, a lever pivoted to said link to form a toggle joint, a pivoted arm carrying said lever, means for causing an initial snap action of said toggle joint, and means engaging said pivoted arm and adapted to move said link and lever as a unit, the arrangement being adapted to first cause said valve to snap open to a given opening and then to be progressively actuated.

15. In combination, a valve, a link associated therewith and adapted to control the opening of said valve, a lever pivoted to said link to form a toggle joint, a pivoted arm carrying said lever, a rotatable arm, resilient means interconnecting said rotatable arm and said lever and adapted to cause a snap movement of said toggle joint when said rotatable arm passes center, and means carried by said rotatable arm and engaging said pivoted arm for moving said link and lever as a unit.

16. In combination, a valve, an arm adapted to control the position thereof, a rotatable shaft carrying said arm, a transverse pin mounted on said shaft and carrying a beveled pinion, a pair of beveled gears journaled on said shaft in engagement with said pinion, motor-control means adapted to operate one of said beveled gears, a ratchet associated with the second beveled gear, means normally locking said ratchet, means responsive to interruption of driving current to said motor for releasing said ratchet, and means adapted to rotate said shaft to a position to close said valve when said ratchet is released.

17. In combination, a valve, a control means therefor comprising a rotatable shaft, a transverse pin mounted on said shaft and carrying a beveled pinion, a pair of beveled gears on said shaft in engagement with said pinion, motor-control means adapted to operate one of said gears, a commutator carried on said shaft, brushes associated with said commutator and adapted to control the operation of said motor, a ratchet associated with the second of said beveled gears, a pawl normally locking said ratchet, means responsive to interruption of the driving current of said motor for releasing said pawl, and spring means associated with said shaft and adapted to rotate said shaft into valve closing position when said pawl is released, said brushes being spaced about said commutator so as to cause an initial substantial movement of said motor and to thereafter cause smaller progressive movements thereof as said brushes are progressively energized.

18. In combination, a condition-responsive device, a condition-control device, control mechanism for said condition-control device comprising means operable in response to successive movement of said condition-responsive device to first cause a substantial predetermined movement of said control device and to thereafter cause progressive movement thereof, a motor adapted to operate said control device, said motor having an armature, a field coil and pole pieces in induced relationship thereto, a second coil in induced relationship to said field coil, pairs of shading coils carried on said pole pieces and adapted when energized to cause reversible rotation of said armature, a condition-responsive device, and means controlled thereby for selectively connecting said second coil to said shading coils whereby to cause selective energization thereof and to cause reversible operation of said motor.

19. In combination, a motor, a shaft operated thereby, a commutator operated in accordance with said shaft, and a pair of sets of brushes spaced to progressively engage said commutator, all of the brushes of one set being in contact with said commutator when all of the brushes of the other set are disengaged therefrom, said brushes being so spaced that the progressive movement of said commutator alternately breaks contact with a brush of one set and makes contact with a brush of the other set whereby the angular positions of said commutator when contact is broken with the brushes of one set are intermediate the angular positions when contact is broken with the brushes of the other set.

20. In combination, a condition-control system comprising a fluid-supply valve adapted to control a condition, a control means for said valve comprising a rotatable shaft, a transverse pin mounted on said shaft and carrying a beveled pinion, a pair of beveled gears on said shaft in engagement with said pinion, motor-control means adapted to operate one of said gears, a commutator carried on said shaft, brushes associated with said commutator and adapted to control the operation of said motor, a ratchet associated with the second of said beveled gears, a pawl normally locking said ratchet, means responsive to interruption of the driving current of said motor for releasing said pawl, means for rotating said shaft into valve closing position when said pawl is released, said brushes being spaced about said commutator so as to cause an initial substantial movement of said motor and to thereafter cause smaller progressive movements thereof as said brushes are progressively energized, and a condition-responsive means adapted to selectively energize said brushes.

21. In combination, a valve, a control means therefor comprising a rotatable shaft, a transverse pin mounted on said shaft and carrying a beveled pinion, a pair of beveled gears on said shaft in engagement with said pinion, motor-control means adapted to operate one of said gears, a commutator carried on said shaft, brushes associated with said commutator and adapted to control the operation of said motor, a ratchet associated with the second of said beveled gears, a pawl normally locking said ratchet, means responsive to interruption of the driving current of said motor for releasing said pawl, and means for rotating said shaft into valve closing position when said pawl is released, said brushes being spaced about said commutator so as to cause an initial substantial movement of said motor and to thereafter cause smaller progressive movements thereof as said brushes are progressively energized.

22. In combination, a condition-control means, a condition-responsive means, electrically-operated means for said condition-control means comprising means responsive to progressive operation of said condition-responsive means in one direction to cause first an initial substantially instantaneous movement of said condition-control means through a given range and thereafter to cause progressive movement of said condition-control means through a second range and means responsive to progressive operation of said condition-responsive means in the reverse direction to first cause progressive reverse movement of said condition-control means through said second range and to thereafter cause a substantially instantaneous reverse movement of said condition-control means, through said given range to its initial position; and means responsive to failure of power for said electrically-operated means to cause a substantially instantaneous movement of said condition-control means to its initial position from any operating position.

HAZOR J. SMITH.